United States Patent Office 2,980,676
Patented Apr. 18, 1961

2,980,676
GLYCIDYL ETHERS OF N-METHYLOLAMINO-1:3:5-TRIAZINES

Paul Zuppinger, Arlesheim, and Willy Fisch, Binningen, Switzerland, assignors to Ciba Limited, Basel, Switzerland, a Swiss firm
No Drawing. Filed July 15, 1958, Ser. No. 748,587
Claims priority, application Switzerland July 24, 1957
4 Claims. (Cl. 260—249.6)

The present invention provides new ethers of N-methylolamino-1:3:5-triazines in which at least one N-methylol group is etherified with a radical containing epoxide groups, more especially with a glycidyl radical. Of special value are products that contain $z$ epoxide groups calculated on the average molecular weight, $z$ being a whole number or fractional number greater than 1.

The new ethers correspond, for example, to the general formula

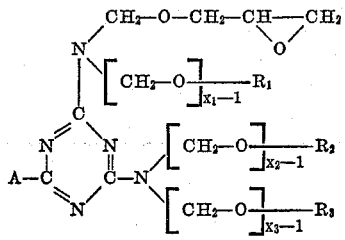

in which $R_1$, $R_2$ and $R_3$ represent each a hydrogen atom, or a lower alkyl, or lower alkenyl radical or a glycidyl radical; $x_1$, $x_2$ and $x_3$ each is a whole number not exceeding 2; and A represents an aliphatic, cycloaliphatic, araliphatic or aromatic hydrocarbon radical, more especially an alkyl, tetrahydrophenyl or phenyl radical, or a radical of the formula

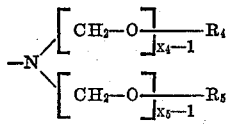

in which $R_4$ or $R_5$ respectively have the same meanings as $R_1$, $R_2$ or $R_3$ and $x_4$ and $x_5$ have the same meaning as $x_1$, $x_2$ and $x_3$.

The new compounds are obtained when in an N-methylolamino-1:3:5-triazine or in an ether thereof with a lower alcohol at least one radical containing epoxide groups is introduced which radical is an N-methylol group replaces the hydrogen atom bound to oxygen.

It is of advantage to react an N-methylolamino-1:3:5-triazine, or an ether thereof derived from a lower alcohol, with a halogenohydrin which is derived from a polyhydric and preferably saturated aliphatic alcohol containing at least 3 carbon atoms and which contains, in addition to the hydroxyl group in vicinal position to the halogen atom, at least one additional etherifiable, preferably primary, alcoholic hydroxyl group; the resulting etherification product containing halogeno-hydrin groups is then converted into the corresponding epoxy compound in the presence of an alkali accompanied by elimination of hydrogen halide from the halogenohydrin groups.

The N-methylol-amino-1:3:5-triazines or their ethers, used as starting materials in the present process, are preferably highly methylolated aminotriazines or etherification products thereof with lower, preferably saturated, aliphatic alcohols. Among these compounds may be mentioned more especially reaction products of formaldehyde with melamine which condensates may contain 1 to 6 methylol groups and are as a rule mixtures of different compounds. There may be mentioned trimethylol-melamine and more especially hexamethylolmelamine, likewise suitable are formaldehyde condensation products of N-substituted melamines such as N-butylmelamine, N-phenylmelamine, N-tolylmelamine, N-cyclohexylmelamine, N:N-diallylmelamine, N:N-dibenzylmelamine or N-tertiary octylmelamine. There may also be used methylol compounds of such derivatives of melamine as contain additionally at least one amino group, for example methylol compounds of melam, melem, ammeline, ammelide, of halogen-substituted aminotriazines such as 2-chloro-4:6-diamino-1:3:5-triazine, or of aminotriazines substituted by alloxy groups such as 2-amino-4:6-alloxy-1:3:5-triazine and 2-alloxy-4:6-amino-1:3:5-triazine; furthermore methylol compounds of guanamines such as formoguanamine, acetoguanamine, n-butyroguanamine, isobutyroguanamine, methacryloguanamine, sorboguanamine, n-valeroguanamine, caproguanamine, heptanoguanamine, caprylo guanamine, 4-ethyl-2-octanoguanamine, stearoguanamine, linoleoguanamine, Δ³-tetrahydrobenzoguanamine, hexahydrobenzoguanamine, 3-methyl-Δ³-tetrahydrobenzoguanamine, 3-methyl-hexahydrobenzoguanamine, 3:4-dimethyl-Δ³-1:2:5:6-tetrahydrobenzoguanamine, 3:4-dimethyl-hexahydrobenzoguanamine; phenylacetoguanamine, tolylacetoguanamine, benzoguanamine, ortho-, meta- or para-toluguanamine, ortho-, meta- and para-xyloguanamine, α- and β-naphthoguanamine; furthermore of diguanamines, for example such as correspond to the formula

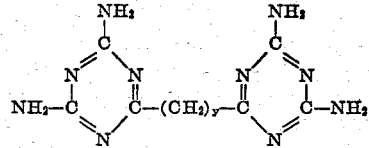

(in which $y$ is a small whole number) such as adipoguanamine. There may be mentioned tetramethylolbenzoguanamine and tetramethylol-acetoguanamine.

The esters with lower alcohols which may likewise be used may be derived from the afore-mentioned compounds and from lower saturated alcohols such as methanol, ethanol, n-propanol, isopropanol, n-butanol or isobutanol, as well as from lower unsaturated alcohols such as allyl alcohol, methallyl alcohol or 2-butene-1-ol. There may be used, for example, methyl ethers of a methylolmelamine containing 3 to 6 methylol groups of which 2 to 6 are etherified.

The halogenohydrin used for converting the N-methylolaminotriazine into the new glycidyl ether is preferably a monohalogenohydrin derived from saturated aliphatic trihydric alcohols such as gycerol, butanetriol-1:2:4, butanetriol-1:2:5, hexanetriol-1:2:5 and similar compounds, in which a hydroxyl group in α- or β-position may be halogen-substituted. Particularly suitable are monohalogenohydrins of the general formula

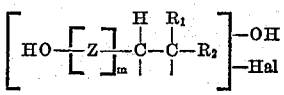

in which $R_1$ and $R_2$ each represents a hydrogen atom or an alkyl radical; Z a radical —$CH_2$— or a radical —$C_nH_{2n}$—O—; $m$ is a small whole number; $n$ is a small whole number, at least 2; and Hal represents a halogen atom.

As examples may be mentioned 1-chlorobutanediol-2:4, 3-chloropentanediol-1:4, glycerol-α-monochlorohydrin, glycerol-β-monochlorohydrin, 3-chlorobutanediol-1:2, 2-bromobutanediol-1:3, 1-chloropentanediol-2:5, 1-chlorhexanediol-2:6, 2-bromohexanediol-3:6, 3-chlorohexanediol-1:2; furthermore reaction products of epichlorohydrin with a glycol, for example ethylene glycol.

The reaction of the formaldehyde-aminotriazine condensation product—which may be etherified with a lower alcohol—with the halogenohydrin is advantageously performed in a neutral or acid medium and, if desired, with heating to, for example 70–100° C., whereby etherification or transesterification is produced, accompanied by the elimination of water or a lower alcohol.

To convert the resulting ether containing halogenohydrin groups into the epoxy compound use is preferably made of strong alkalies such, for example, as sodium carbonate, potassium carbonate, sodium hydroxide or potassium hydroxide. The ether can be dissolved in an inert organic solvent, for example in a low-boiling halogenated hydrocarbon, the alkali being added in solid form; during this operation it is of advantage to remove the reaction water formed from the reaction mixture continuously and, if desired, azeotropically. Alternatively, the alkali may be added as a concentrated aqueous solution, the addition being advantageously performed continuously and the water added being distilled off continuously, if desired in vacuo. The reaction according to the present process invariably yields mixtures of ethers containing epoxide groups. The content of epoxide groups depends on the reaction conditions, on the starting materials chosen and on the selected molecular ratio of halogenohydrin to the hydroxy equivalent of the N-methylolaminotriazine. In general, it is impossible to define accurately the constitution of the reaction products of the present process; it is therefore of advantage to define the polyether mixture by its content of glycidyl groups (epoxide equivalents per kilogram) and by the hydrolysable chlorine content (chlorine equivalents per kilogram) and the chlorine content which can be determined by combustion analysis.

The ethers containing epoxide groups, prepared by the present process, are products of medium to high viscosity, of pale color or perfectly colorless when suitable starting materials have been used. They react with the usual hardeners for epoxy compounds; accordingly, products containing more than one epoxide group per mol can be cross-linked and hardened respectively, like other polyfunctional epoxy compounds or epoxy resins, by the addition of such hardeners. Both basic and acid compounds are suitable as such hardeners. Particularly good results have been achieved with: Amines or amides such as aliphatic and aromatic primary, secondary or tertiary amines, for example mono-, di- or tri-butylamines, paraphenylenediamine, ethylenediamine, N:N-diethylethylenediamine, diethylenetriamine, triethylenetetramine, trimethylamine, diethylamine, triethanolamine, Mannich bases, piperidine, piperazine, guanidine and guanidine derivatives such as phenyldiguanidine, diphenyl-guanidine, dicyandiamide, aniline-formaldehyde resins, polymers of aminostyrenes, polyamides for example from aliphatic polyamines and dimerised or trimerised unsaturated fatty acids, isocyanates, isothiocyanates, polybasic carboxylic acids and anhydrides thereof, for example phthalic anhydride, methylendomethylenetetrahydrophthalic anhydride, dodecenylsuccinic anhydride, hexahydrophthalic anhydride, hexachloroendomethylenetetrahydrophthalic anhydride, or endomethylenetetrahydrophthalic anhydride or mixtures thereof; maleic or succinic anhydride, polyhydric phenols, such as resorcinol, hydroquinone, quinone, phenol-aldehyde resins, oil-modified phenol aldehyde resins, reaction products of aluminum alcoholates or phenolates with compounds displaying tautomeric reaction of the type of acetoacetic ester, Friedel-Crafts catalysts such as aluminum chloride, antimony chloride, tin tetrachloride, ferric chloride, zinc chloride, boron trifluoride and their complexes with organic compounds, and more especially phosphoric acid. The term "harden" is here used to indicate the conversion of the aforementioned glycidyl ethers into insoluble and infusible resins.

The hardenable polyglycidyl ethers, or their mixtures with hardeners, can be mixed at any stage of the process prior to hardening with fillers, plasticisers, pigments, dyestuffs or the like. Suitable extending agents and fillers are, for example, glass fibers, mica, quartz powder, cellulose, kaolin, finely divided silicic acid (trademark "AEROSIL") or metal powders.

The mixtures of the polyglycidyl ethers according to this invention and the hardeners can be used with or without the addition of a filler for the manufacture of laminating resins, lacquer coatings, casting resins, pore fillers, putties and adhesives. When a suitable hardener—more especially phosphoric acid—is used, the resulting product is especially fast to light and is very suitable for cementing glass, for example making optical lenses or laminating glass fabrics.

The following examples illustrate the invention:

Example 1

219 grams of hexamethylolmelamine hexamethyl ether (prepared by etherifying hexamethylolmelamine with methanol and hydrochloric acid, as described in Helvetica Chimica Acta, volume XXIV, page 317E) are heated for 1 hour at 90 to 100° C. with 525 grams of glycerol-α-monochlorohydrin under increasing vacuum until methanol no longer distils over.

On analysis the resulting etherification product is revealed to contain:

| | Percent |
|---|---|
| Nitrogen | 9.59 |
| Chlorine | 22.65 | of which the chlorine combined in halogenohydrin groups (determined by hydrolysis with sodium methylate and back-titration of the latter) amounts to 4.93 gram atoms per kilogram.

100 grams of the etherification product described above are dissolved in 300 grams of ethylene dichloride and 47.2 grams of powdered potassium carbonate are added. The reaction mixture is kept at the boil for 4 hours on an oil bath heated at 120 to 130° C., the reaction water formed being distilled off azeotropically together with ethylene dichloride. The aqueous phase is separated from the distillate, and the ethylene dichloride is returned into the reaction vessel. Filtration is then performed while hot through specially prepared kieselguhr suitable as a filter aid (trademark "Hyflo-super Cel"), and the ethylene di-chloride is distilled off within 1 hour under diminished pressure (20 mm. Hg), to yield 80 grams of a pale-colored, medium viscous—that is to say still pourable—resin containing 12.2% of nitrogen, 10.2% of chlorine and 4.45 mols of epoxide groups per kilogram of resin.

Example 2

100 grams of etherification product described in the first paragraph of Example 1 are dissolved in 30 cc. of dichloromethane and 28.4 grams of powdered solid sodium hydroxide of 96% strength are added. A strongly exothermic reaction sets in immediately so that the dichloromethane begins to boil and distil automatically. When the exothermic reaction which takes about 25 minutes has subsided, the reaction mixture is heated for another 35 minutes at the boiling temperature of dichloromethane and then filtered through "Hyflo-super Cel."

When the dichloromethane has been distilled off under diminished pressure, 63 grams of a pale-colored resin of medium viscosity, containing 4.57 mols of epoxide groups per kilogram of resin, are obtained.

Example 3

162 grams of hexamethylolmelamine (containing 1 mol of combined water; prepared as described in Helvetica Chimica Acta, volume XXIV, page 315E) are reacted under thorough stirring with 662.5 grams of glycerol-α-monochlorohydrin in the presence of 59.25 grams of concentrated hydrochloric acid for 1½ hours at 25° C., then neutralized with 35 grams of calcined sodium carbonate of 95% strength, and the sodium chloride formed is filtered off.

100 grams of the above etherification product are dissolved in 370 grams of dioxane. While stirring and cooling the mixture well, 60 grams of 50% aqueous sodium hydroxide solution are added dropwise in the course of 70 minutes in a manner such that the reaction temperature does not rise above 20° C. After the mixture has been left to itself for a short time, it separates into two layers: The supernatant liquid phase is filtered through paper and evaporated in a vacuum of about 30 mm. Hg at a temperature not exceeding 46° C. within 75 minutes to yield 52 grams of a pale yellow resin of low viscosity containing 4.27 mols of epoxide groups per kilogram of resin. The lower, resinous phase is dissolved in 500 cc. of absolute ethanol to remove the precipitated sodium chloride, then filtered and evaporated in vacuo. The residue is once more taken up in 100 cc. of alcohol to remove the last traces of salt, filtered and evaporated to yield 18 grams of a dark-yellowish resin of medium viscosity, containing 3.34 mols of epoxide groups per kilogram of resin.

*Example 4*

610 grams of aqueous formaldehyde solution of 40% strength are adjusted with about 0.8 cc. of aqueous sodium hydroxide solution of 30% strength to a pH of 8.2 to 8.4, and 280.5 grams of benzoguanamine are added; the mixture is then heated with stirring on a water bath at an external temperature of 95° C. After heating for about 10 minutes at an internal temperature of 72° C. the benzoguanamine passes into solution. Dehydration under a weak vacuum is then begun; in the course of 40 minutes under 56 mm. Hg pressure at about 70° C. a total of 250 cc. of water passes over. 750 cc. of butanol are then added and dehydration is continued for 1 hour at 70° C. under a vacuum of about 56 mm. Hg, the butanol which distils over being continuously recycled. During this operation another 110 cc. of water pass over. A solution of 2.0 cc. of concentrated hydrochloric acid in 20.0 cc. of butanol is then added. Inside of 75 minutes at about 70° C. and under a vacuum of 60 mm. Hg another 110 cc. of water pass over. The reaction mixture is kept at 70° C. for another ¾ hour, then neutralized with 1.9 cc. of aqueous sodium hydroxide solution of 30% strength and filtered, to yield 682 grams of a methylol-benzoguanamine butyl ether of low viscosity which contains about 3.8 mols of butyl groups per mol of benzoguanamine.

106.4 grams of the butylated methylol-benzoguanamine described above are reacted with 83.2 grams of glycerol-α-monochlorohydrin for 2¼ hours at 95–107° C. under a vacuum of 15 mm. Hg, during which 50 cc. of butanol pass over. The residue is taken up in 520 cc. of dichloromethane, 31.4 grams of powdered solid sodium hydroxide of 96% strength are stirred in, and the whole is allowed to react for another hour; the reaction mixture is then concentrated at 40° C. in vacuo, while dichloromethane distils off, to a dry content of 64.8% and then filtered, to yield 115 grams of a yellowish resin solution containing 1.25 mols of epoxide groups per kilogram, corresponding to 1.9 mols of epoxide groups per kilogram of resin of 100%.

*Example 5*

A mixture prepared of acetoguanamine and aqueous formaldehyde solution of 37% strength at a molar ratio of 1:6, adjusted with sodium hydroxide solution to a pH of about 8 and allowed to react for about 30 minutes at 60° C. By adding aqueous hydrochloric acid the pH is then adjusted to about 4.5, and the reaction is allowed to continue at 60° C. until 1 drop of the reaction solution produces turbidity on being introduced into about 2 cc. of aqueous sodium chloride solution of 18 to 22% strength. The reaction mixture is then adjusted to a pH value of about 8.2 with sodium hydroxide solution and concentrated under reduced pressure at 35–50° C. to a dry content of 70%.

330 grams of the resulting methylolacetoguanamine are heated with 386 grams of glycerol-α-monochlorohydrin for 2 hours at 90 to 98° C. under increasing vacuum until 176 grams of distillate have been obtained. The residue is taken up in 1080 grams of dichloromethane, 146 grams of powdered solid sodium hydroxide of 96% strength are stirred in at 39 to 41° C., and the mixture is allowed to react for 50 minutes. The precipitated sodium chloride and the matter insoluble in dichloromethane are removed by centrifuging, and the resin solution is then evaporated in vacuo to a dry content of 72.5%, to yield 302 grams of a yellowish resin solution which contains 2.15 mols of epoxide groups per kilogram, corresponding to 2.96 mols of epoxide groups per kilogram of resin of 100%.

*Example 6*

Within 2 hours and 25 minutes 370 grams of epichlorohydrin are added dropwise to a well-stirred mixture of 744 grams of ethylene glycol and 11.44 grams of boron trifluoride dihydrate (BF$_3$.2H$_2$O) in a manner such that the reaction temperature does not rise above 60° C. The mixture is allowed to react for 75 minutes, during which the temperature drops to 25° C., and 7 grams of solid sodium hydroxide of 96% strength are then added. The mixture is then heated under a vacuum of 16–20 mm. Hg at an oil bath temperature of 140 to 160° C., with 543 grams of excess glycol passing over in the course of 2½ hours. The residue consists of 579 grams of the resulting ether of the formula

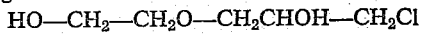

HO—CH$_2$—CH$_2$O—CH$_2$CHOH—CH$_2$Cl which is then filtered through "Hyflo-super Cel."

118 grams of the hexamethylolmelamine hexamethyl ether described in Example 1, together with 280 grams of the ether obtained from ethylene glycol and epichlorohydrin described above, are then heated for 2 hours at 70 to 80° C. under increasing vacuum, during which 43 grams of methanol pass over. 330 grams of the reaction product thus obtained are dissolved in 1230 cc. of dichloromethane and the well-stirred mixture is mixed with 70.2 grams of powdered solid sodium hydroxide of 96% strength. Further working up as described in Example 2. When dichloromethane has been distilled off to a dry content of 59%, a yellowish resin solution is obtained which contains 1.8 mols of epoxide groups per kilogram, corresponding to 3.0 mols of epoxide groups per kilogram of resin of 100%.

*Example 7*

728 grams of a methylolmelamine allyl ether (containing about 5 allyl groups per mole of melamine) prepared as described in U.S. patent application Serial No. 392,058, filed November 13, 1953, by Gustav Widmer et al. [Product I], are mixed with 441.7 grams of glycerol-α-monochlorohydrin. The mixture is heated with thorough stirring under a vacuum of 16 mm. Hg at an oil bath temperature of 120° C. for 1½ hours, during which 231 grams of allyl alcohol distil over. 500 grams of the resulting reaction product are dissolved in 1000 cc. of dichloromethane, 83.6 grams of powdered solid sodium hydroxide of 96% strength are stirred in, and the whole is then further worked up as described in Example 2. When dichloromethane has been distilled off to achieve a dry content of 93%, a pale yellowish product of medium to high viscosity is obtained which contains 1.9 mols of epoxide groups per kilogram, corresponding to 2.0 mols to epoxide groups per kilogram of resin of 100%.

*Example 8*

120 grams of the epoxy resin prepared according to Example 2 are intimately mixed with 10.8 grams of triethylenetetramine. The mixture is freed in vacuo from occluded air and then poured into an aluminum form measuring 14 x 4.2 x 1.1 cm. After 15 minutes an exothermic reaction sets in which reaches its maximum after 30 minutes, to yield a transparent, yellowish casting having an impact bending strength of 2.2 cm. kg./sq. cm. and a bending strength of 7.75 kg./sq. mm.

When the above mixture of epoxy resin+hardener is brushed over sheet aluminum, a clear varnish coat is obtained which becomes dust dry at 22° C. and 65% relative humidity within 1 hour 50 minutes; a coat 250µ thick possesses after 8 hours a pendulum hardness according to Persoz of 35 seconds and after 24 hours of 102 seconds. (The determination of the hardness with the pendulum apparatus according to Persoz has been desired in "Comptes Rendues de l'Académie des Sciences" 221 [1945], page 703.) The deep drawing test according to Erichsen gave after 24 hours for a coat 300µ thick a value of 3.0 mm. (The testing method with the Erichsen apparatus has been described in "Farbenchemiker," volume 8 [1937], page 197.) A varnish coat 2 days old, kept covered with N-sodium hydroxide solution for 16 hours, remained unaffected.

When 12 pieces of glass fabric "AV 281" (makers Messrs. Fibres de Verre, Lausanne) measuring 6 x 12 cm. and having a total weight of 21 grams are prepared for laminating and then impregnated with 26 grams of the above mixture of epoxy resin+hardener and the whole is pressed at 118° C. in a closed mould for 30 minutes under a maximum pressure of 10 kg./sq. cm., a glass fiber laminate is obtained having a bending strength of 16.2 kg./sq. cm., an impact bending strength of over 95 cm. kg./sq. cm. and a modulus of elasticity of 1130 kg./sq. mm.

When the curing is performed at room temperature and the laminating is carried out without pressing (manual laminating method), at a ratio of glass fabric to mixture of resin+hardener of 22:25, a practically colorless glass fiber laminate is obtained which shows the following characteristics after 8 days: Bending strength 12 kg./sq. mm.; impact bending strength over 114 cm. kg./sq. cm.; modulus of elasticity 1020 kg./sq. mm.

Example 9

10 grams ($a$) and 20 grams ($b$) respectively of the epoxy resin described in Example 2 are intimately mixed with 10 grams of a polyamide resin obtained by condensing dimerised unsaturated vegetable fatty acids with aliphatic polyamines, marketed under the trademark "VERSAMID XD-140." The resulting mixture is spread with a doctor device over iron sheet and a glass plate respectively. The varnish coat thus contained in either case is dust dry after 3½ hours ($a$) and after 3 hours ($b$) respectively.

After hardening for 24 hours at 24° C. and 65% relative humidity the Erichsen values were 9.0 mm. for ($a$), coat thickness 135µ, and 7.0 mm. for ($b$), coat thickness 160µ respectively. The Persoz hardness was 32 seconds for ($a$), coat thickness 135µ, and 100 seconds for ($b$), coat thickness 160µ respectively. After hardening for 10 minutes at 100° C. the Erichsen values were 7.7 mm. ($a$) for a coat thickness of 150µ and 6.6 mm. ($b$) for a coat thickness of 140µ. The Persoz hardness values were 60 seconds for ($a$), coat thickness 64µ, and 260 seconds for ($b$), coat thickness 145µ. When the varnish coats hardened 100° C. are kept covered with N-sodium hydroxide solution for 16 hours, they remain completely unaffected.

When 2 strips of aluminum (1 mm. thick, 2.5 cm. wide, 17 cm. long) are cemented together with an overlap of about 1 cm. with the above resin+hardener mixtures ($a$) and ($b$) and then hardened for 10 minutes at 100° C., the cemented bonds display shear strength values of 0.58 kg./sq. mm. for ($a$) and of 0.67 kg./sq. mm. for ($b$) respectively. The above resin+hardener mixtures retain their pot-life for about 2 hours at 24° C.

Example 10

10 grams of the epoxy resin described in Example 2 are mixed with 0.5 gram of phosphoric acid of 99% strength. A coat about 1 mm. thick is produced with this mixture on a glass plate and then hardened for 45 minutes at 120° C., to yield a perfectly glass-clear, colorless coat which displays no discoloration whatever after having been exposed to light in a fadeometer for 100 hours.

When two strips of glass (3 mm. thick, 2.5 cm. wide, 15 cm. long) are cemented together with above resin+hardener mixture with an overlap of 1 cm., then hardened for 6 days at room temperature, the cemented bond displays a tension shear strength of 0.45 kg./sq. mm. 52% of the tests revealed fracture of the glass, 48% fracture of the bond. At room temperature the above resin+hardener mixture has a pot-life of about 30 minutes.

Example 11

68.5 grams of the epoxy resin described in Example 2 are mixed ($a$) with 51.5 grams of methylendomethylenetetrahydrophthalic anhydride and ($b$) with 51.5 grams of a mixture of 60 grams of methylendomethylenetetrahydrophthalic anhydride and 40 grams of hexachloroendomethylenetetrahydrophthalic anhydride.

When aluminum strips are cemented together with these resin+hardener mixtures as described in Example 9, then hardened for 6 hours at 150° C., the cemented bonds display a shear strength of 1.13 kg./sq. mm. for ($a$) and of 1.07 kg./sq. mm. for ($b$).

What is claimed is:

1. Ethers of N-methylolamino-1:3:5-triazines of the formula

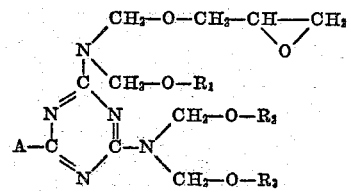

in which $R_1$, $R_2$ and $R_3$ are members selected from the class consisting of hydrogen, lower alkyl, lower alkenyl and glycidyl, and A stands for a member selected from the class consisting of alkyl, phenyl and a radical of the formula

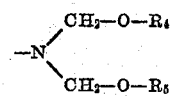

in which $R_4$ and $R_5$ are members selected from the class consisting of hydrogen, lower alkyl, lower alkenyl and glycidyl.

2. An ether of a N-methylolmelamine of the formula

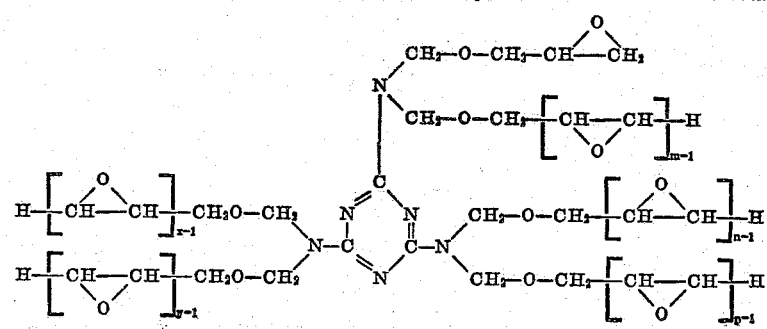

wherein $m$, $n$, $p$, $x$ and $y$ each represent a whole number of at most 2.

3. An ether of an N-methylolbenzoguanamine of the formula

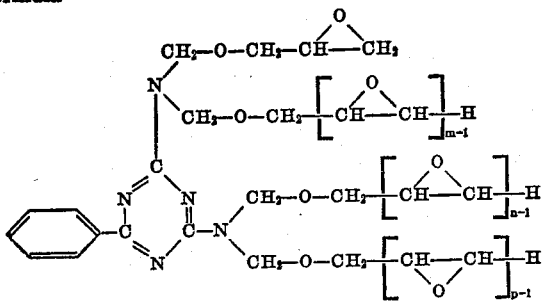

wherein $m$, $n$ and $p$ each represent a whole number of at most 2.

4. An ether of an N-methylolacetoguanamine of the formula

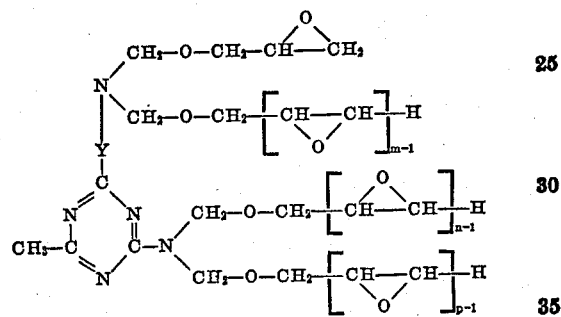

wherein $m$, $n$ and $p$ each represent a whole number of at most 2.

References Cited in the file of this patent

UNITED STATES PATENTS

| | | |
|---|---|---|
| 2,381,121 | Ericks | Aug. 7, 1945 |
| 2,414,289 | Ericks | Jan. 14, 1947 |
| 2,528,359 | Greenlee | Oct. 31, 1950 |
| 2,528,360 | Greenlee | Oct. 31, 1950 |
| 2,741,607 | Bradley | Apr. 10, 1956 |

FOREIGN PATENTS

| | | |
|---|---|---|
| 601,983 | Great Britain | May 18, 1948 |
| 773,874 | Great Britain | May 1, 1957 |

UNITED STATES PATENT OFFICE
CERTIFICATE OF CORRECTION

Patent No. 2,980,676                              April 18, 1961

Paul Zuppinger et al.

It is hereby certified that error appears in the above numbered patent requiring correction and that the said Letters Patent should read as corrected below.

Column 6, line 65, for "2.0 mols to" read -- 2.0 mols of --; column 7, line 8, for "desired" read -- described --; column 9, claim 4, in the formula, the symbol "Y" linking the ring carbon and the nitrogen should not appear.

Signed and sealed this 10th day of October 1961.

(SEAL)
Attest:

ERNEST W. SWIDER
Attesting Officer

DAVID L. LADD
Commissioner of Patents
USCOMM-DC